(12) United States Patent
Sobolak et al.

(10) Patent No.: US 10,723,478 B2
(45) Date of Patent: Jul. 28, 2020

(54) LOCKING MECHANISM

(71) Applicant: Hamilton Sundstrand Corporation, Charlotte, NC (US)

(72) Inventors: Piotr Sobolak, Słupsk (PL); Izabela Pawelec, Wieluń (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 70 days.

(21) Appl. No.: 16/191,631

(22) Filed: Nov. 15, 2018

(65) Prior Publication Data

US 2019/0177001 A1 Jun. 13, 2019

(30) Foreign Application Priority Data

Dec. 8, 2017 (EP) ..................................... 17206253

(51) Int. Cl.
*B64D 41/00* (2006.01)
*F15B 15/26* (2006.01)

(52) U.S. Cl.
CPC .......... *B64D 41/007* (2013.01); *F15B 15/261* (2013.01); *F05D 2220/34* (2013.01); *F05D 2260/30* (2013.01); *F05D 2260/57* (2013.01)

(58) Field of Classification Search
CPC . B64D 41/007; F15B 15/261; F05D 2220/34; F05D 2220/50; F05D 2260/38; F05D 2260/52; F05D 2260/57
See application file for complete search history.

(56) References Cited

U.S. PATENT DOCUMENTS

| | | | | |
|---|---|---|---|---|
| 3,708,178 A | * | 1/1973 | Lauricella | B23B 31/1071 279/81 |
| 4,708,548 A | * | 11/1987 | Taylor | B23B 31/1071 279/140 |
| 5,366,313 A | * | 11/1994 | LaBarre | F16B 21/165 403/108 |
| 6,474,215 B1 | | 11/2002 | Boyer et al. | |

(Continued)

FOREIGN PATENT DOCUMENTS

EP 3216701 A1 9/2017

OTHER PUBLICATIONS

Extended European Search Report for International Application No. 17206253.1 dated Jun. 18, 2018, 5 pages.

*Primary Examiner* — Ninh H. Nguyen
(74) *Attorney, Agent, or Firm* — Cantor Colburn LLP

(57) ABSTRACT

A locking mechanism comprises a piston element comprising a piston groove extending in an axial direction along a radially outer surface of the piston element, a housing comprising a bore for receiving the piston element for reciprocating axial movement between a locked position and an unlocked position, a locking ball received in the piston groove and a locking ring mounted for rotational movement about the piston element between a locking position and an unlocking position, the locking ring comprising a radially inner locking ring groove, the locking ring groove having a recess formed in a radially inner surface thereof for receiving the locking ball in the unlocking position of the locking ring. The piston groove comprises a first axially extending section and a second axially extending section, the radial depth (D1) of the first axially extending section being greater than the radial depth (D2) of the second axially extending section.

15 Claims, 9 Drawing Sheets

(56) References Cited

U.S. PATENT DOCUMENTS

| | | | |
|---|---|---|---|
| 8,251,606 B2 | 8/2012 | Blanchard | |
| 9,346,189 B2 * | 5/2016 | Johnsen | ................ B23B 31/006 |
| 9,656,763 B2 | 5/2017 | Bannon | |
| 2013/0327207 A1 | 12/2013 | Sasscer et al. | |
| 2013/0327885 A1 | 12/2013 | Sasscer | |
| 2013/0330121 A1 | 12/2013 | Sasscer et al. | |
| 2015/0232195 A1 | 8/2015 | Bannon | |

* cited by examiner

LOCKING MECHANISM

FOREIGN PRIORITY

This application claims priority to European Patent Application No. 17206253.1 filed Dec. 8, 2017, the entire contents of which is incorporated herein by reference.

TECHNICAL FIELD

The present disclosure relates to locking mechanisms, in particular but not exclusively, to locking mechanisms for Ram Air Turbines (RATs).

BACKGROUND

Ram Air Turbines (RATs) are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn and generate electrical and/or hydraulic power. The RAT is typically pivoted into position by means of an actuator, for example a hydraulic actuator. The actuator typically includes a piston which extends to deploy the RAT. The actuator has a locking mechanism which prevents inadvertent movement of the piston and thus inadvertent deployment of the RAT. The locking mechanism typically comprises a spring loaded locking piston which must be moved in an axial direction to lock the actuator. Such a mechanism is disclosed for example in US 2013/0327207 A1.

A locking mechanism is provided to permit this movement. Typically, the locking mechanism comprises a toggle type linkage, one end of which is coupled to one end of the locking piston and the other end of which is axially fixed and rotatably coupled to a support. A pair of linear solenoid actuators is coupled to the linkage and operable to move the linkage over centre between a locked and an unlocked position. The actuators are coupled to the linkage via an actuator rod which projects on both sides from the linkage. Two actuators are provided for fail safe operation.

The present disclosure provides an alternative locking mechanism which avoids the use of a toggle type linkage.

SUMMARY

From a first aspect, the present disclosure provides a locking mechanism comprising a piston element. The piston comprises a piston groove extending in an axial direction along a radially outer surface of the piston element. The mechanism further comprises a housing comprising a bore for receiving the piston element for reciprocating axial movement between a locked position and an unlocked position. The mechanism further comprises a locking ball received in the piston groove and a locking ring mounted for rotational movement about the piston element between a locking position and an unlocking position. The locking ring comprises a radially inner locking ring groove, the locking ring groove having a recess formed in a radially inner surface thereof for receiving the locking ball in the unlocking position of the locking ring. The piston groove (comprises a first axially extending section and a second axially extending section. The radial depth of the first axially extending section is greater than the radial depth of the second axially extending section. The mechanism is configured such that when the piston element is in its locked position and the locking ring is in its locking position, the radially inner surface of the locking ring groove is in alignment with the piston groove such that the locking ball received in the first axially extending section of the piston groove is prevented from moving outwardly in a radial direction an amount sufficient to enter the second axially extending section of the piston groove and when the piston element is in its locked position but the locking ring is in its unlocking position, the recess in the radially inner surface of the locking ring groove is in radial alignment with the piston groove such that the locking ball received in the first axially extending section of the piston groove can move radially outwardly into the recess, thereby allowing the locking ball to enter the second axially extending section of the piston groove and an axial movement of the piston element from its locked to its unlocked position under a force biasing the piston element towards the housing.

In an embodiment, of the above, the piston element comprises a plurality of, for example three, piston grooves and the locking ring comprises a corresponding plurality of recesses. The mechanism comprises a respective locking ball received within each piston groove.

In an embodiment of the above, the piston grooves and the recesses are circumferentially equi-spaced around the piston element and the locking ring respectively.

In embodiments of the disclosure, the locking mechanism may further comprise anti-rotation elements provided between the piston element and the housing to prevent the piston element rotating in the housing.

In an embodiment of the above, the anti-rotation elements comprise at least one rib extending inwardly from the housing bore for engagement with at least one piston groove of the piston element.

In embodiments of the disclosure, the locking ring is rotationally mounted to the housing.

In embodiments of the above, a bearing, for example a bearing of a low friction material, may be mounted between the locking ring (and the housing.

In embodiments of the disclosure, a chamfered shoulder may be provided between the first and second axially extending sections of the piston groove.

In embodiments of the disclosure, the locking ring recess may be is chamfered at a circumferential edge thereof.

In embodiments of the disclosure, the mechanism may further comprise a biasing element for biasing the piston element from its locked position towards its unlocked position.

In embodiments of the disclosure, the mechanism may further comprise a return spring for biasing the piston element from its unlocked position towards its locked position.

In embodiments of the disclosure, the mechanism may further comprise at least one actuator, for example a pair of actuators for rotating the locking ring between its locking and unlocking positions.

In embodiments of the above, the at least one actuator may be a linear actuator, for example a linear solenoid actuator.

In embodiments of the above, the at least one actuator or the locking ring may comprise a return spring for urging the locking ring towards its locking position upon de-activation of the at least one actuator.

The disclosure also provides a ram air turbine actuation mechanism comprising a spring biased locking piston movable between a first position in which the ram air turbine is held in a retracted position and a second position which releases the ram air turbine. The ram air turbine actuation mechanism further comprises a locking mechanism in accordance with the disclosure. The locking piston of the ram air turbine actuation mechanism is coupled to the piston element of the locking mechanism to apply a force thereto in a direction which biases the piston element towards its unlocked position.

BRIEF DESCRIPTION OF DRAWINGS

An embodiment of the disclosure will now be described by way of example only, with reference to the accompanying drawings in which.

DETAILED DESCRIPTION

Figure 1:
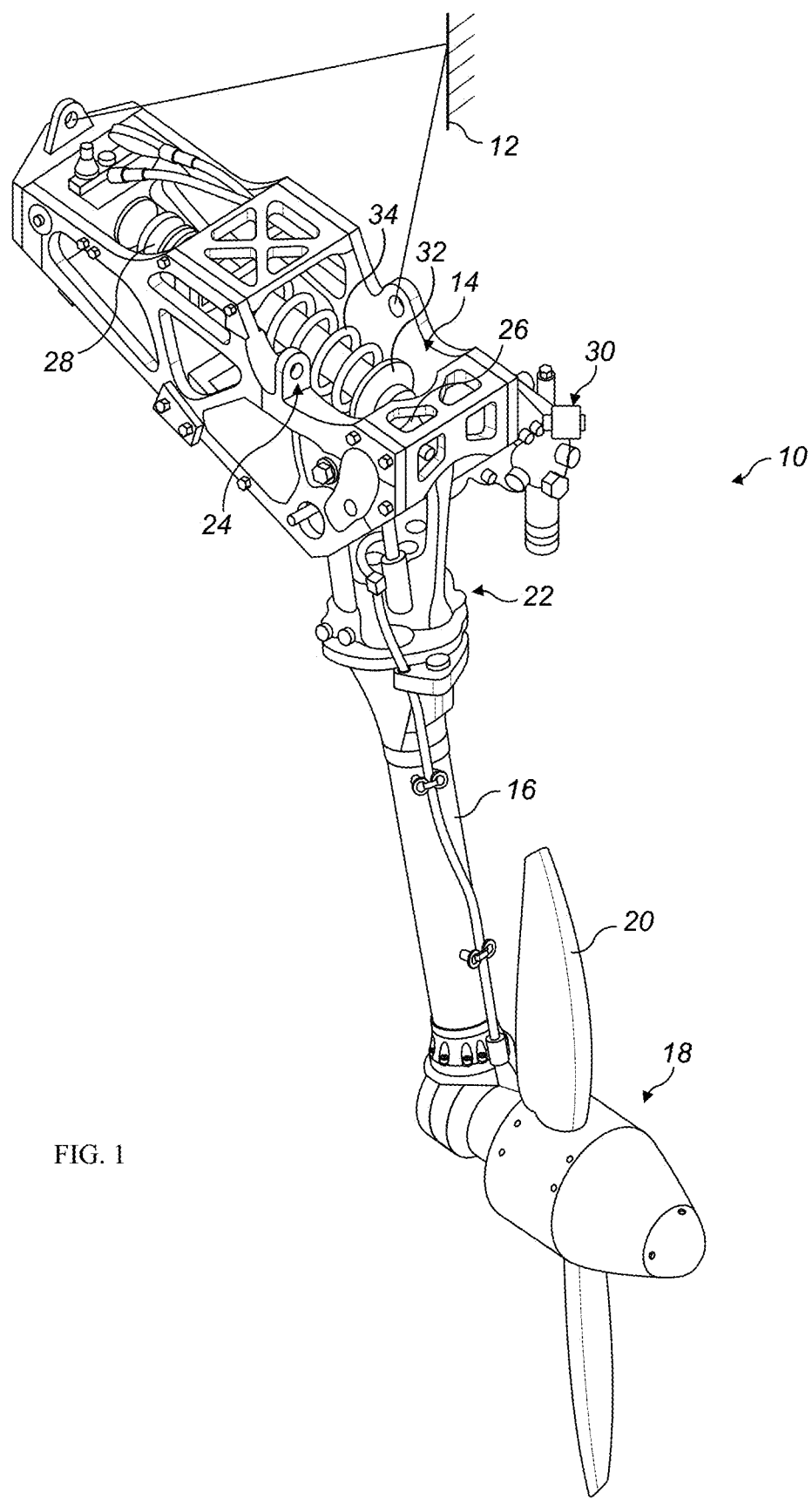
FIG. 1 shows a ram air turbine.

FIG. 1 illustrates an exemplary RAT system 10 which is secured to an aircraft structure 12 by a housing 14. The housing 14 pivotally supports a strut 16 having a turbine 18 at one end. The turbine 18 includes blades 20, which impart rotational drive to a generator 22 and hydraulic pump 30 for example. An actuator 24 is secured to the strut at a first end 26 and to the housing at a second end 28. The actuator 24 is illustrated in its deployed position.

The actuator 24 comprises a cylinder 32 which is biased by a spring 34 in order to deploy the strut 16. When the cylinder 32 is retracted, it is held in its retracted position by means of a locking mechanism 36, details of which will be described with reference to FIG. 2.

Figure 2:
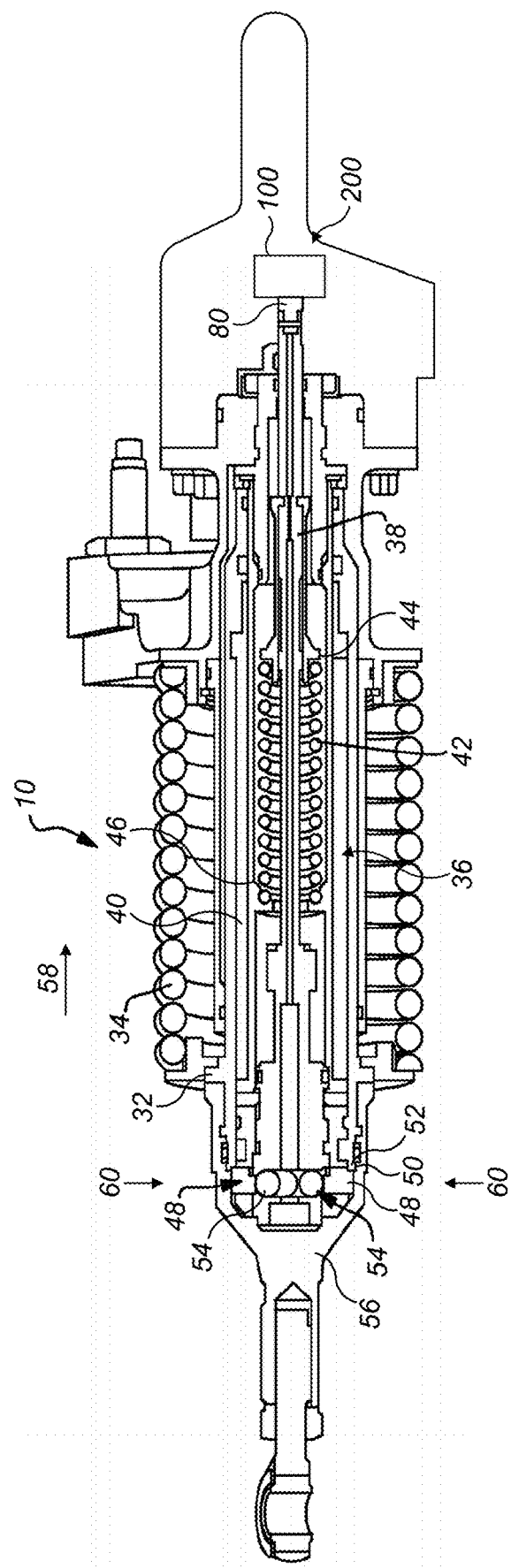
FIG. 2 shows, some detail of the ram air turbine of FIG. 1.
Figure 3A:
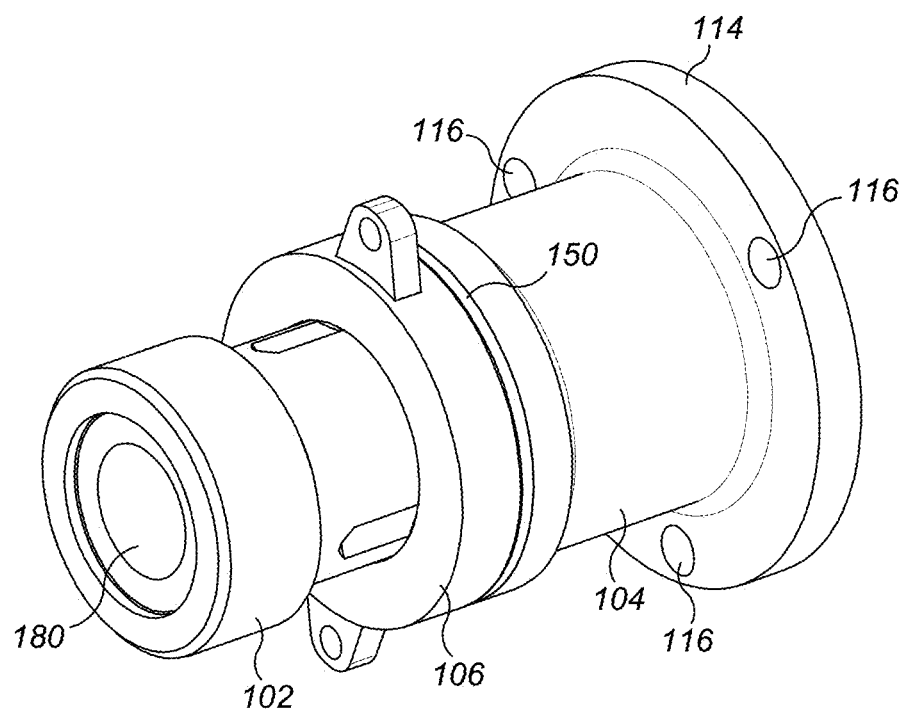
FIGS. 3A and 3B show perspective views of an embodiment of locking mechanism in accordance with the disclosure in a locked position and an unlocked position respectively.
Figure 3B:
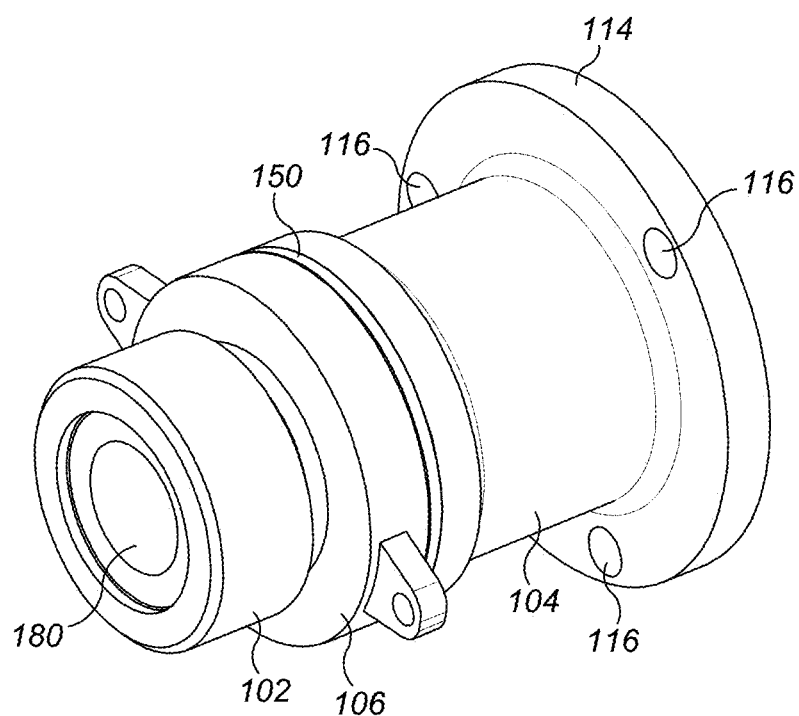

With reference to FIG. 2, the locking mechanism 36 comprises a locking piston or bolt 38 which is received slidably within a sleeve 40. The locking piston 38 is biased to the right in the sense of FIG. 2 by means of a biasing spring 42 which extends between a seat 44 provided on the locking piston 38 and a seat 46 provided on the sleeve 40.

The extensible cylinder 32 of the actuator is slidably mounted around the sleeve 40. Extension of the cylinder 32 is prevented by locking elements 48 mounted at the end of the sleeve. In the locking position, respective shoulders 50, 52 of the cylinder 32 and locking wedges 48 engage to prevent axial movement of the cylinder 32.

A number of rollers 54 are mounted in the distal end 56 of the locking piston 38. However, it will be noted that when the locking piston 38 is moved to the right in a direction of arrow 58 under the force of the biasing spring 42, the wedges 48 may displace in the direction of arrows 60 thereby disengaging the shoulders 50, 52 and allowing the cylinder 32 to extend to deploy the RAT. This general type of locking mechanism is known in the art and is discussed in some detail, for example in US 2013/0330121 A1, US2013/0327885 A1 and US 2015/0232195.

To unlock the locking mechanism, the distal end 80 of the locking piston 38 is coupled to a locking mechanism 100 illustrated only schematically in FIG. 2. In essence, as will be described further below, the locking mechanism 100 is movable between a locking position in which it retains the locking piston 38 in the position shown in FIG. 2 and an unlocking position in which it permits the locking piston 38 to move to the right under the force of the spring 42, move the rollers 54 of the locking piston 38 out of alignment with the locking surfaces of the locking wedges 48, thereby allowing deployment of the actuator cylinder 32.

A locking mechanism in accordance with an embodiment of the disclosure will now be described with reference to FIGS. 3A to 9.

Figure 4A:
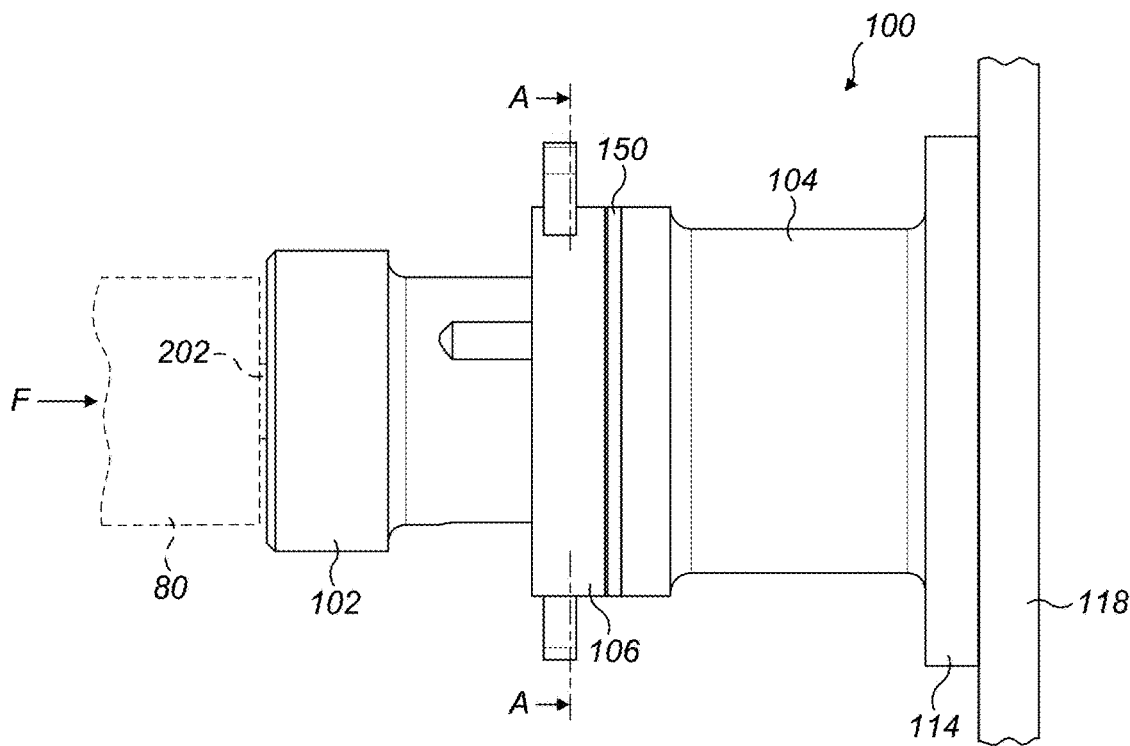
FIGS. 4A and 4B show elevational views of the embodiment of FIGS. 3A and 3B.

As illustrated schematically in FIG. 4A, the locking mechanism 100 may be suitably coupled to the locking piston 38 of the ram air turbine discussed above. However, it will be appreciated that the locking mechanism 100 may be used in many other applications.

The locking mechanism 100 comprises a piston element 102, a housing element 104, a locking ring 106, a plurality of locking balls 108 and a return spring 110.

The housing 104 comprises a bore 112 (FIGS. 5A & 5B) for receiving the piston element 102. The piston element 102 is slidably received within the bore 112 so as to be able to move axially in the bore between the locked position shown in FIGS. 3A to 8A and the unlocked position shown in FIGS. 3B to 8B.

Figure 4B:
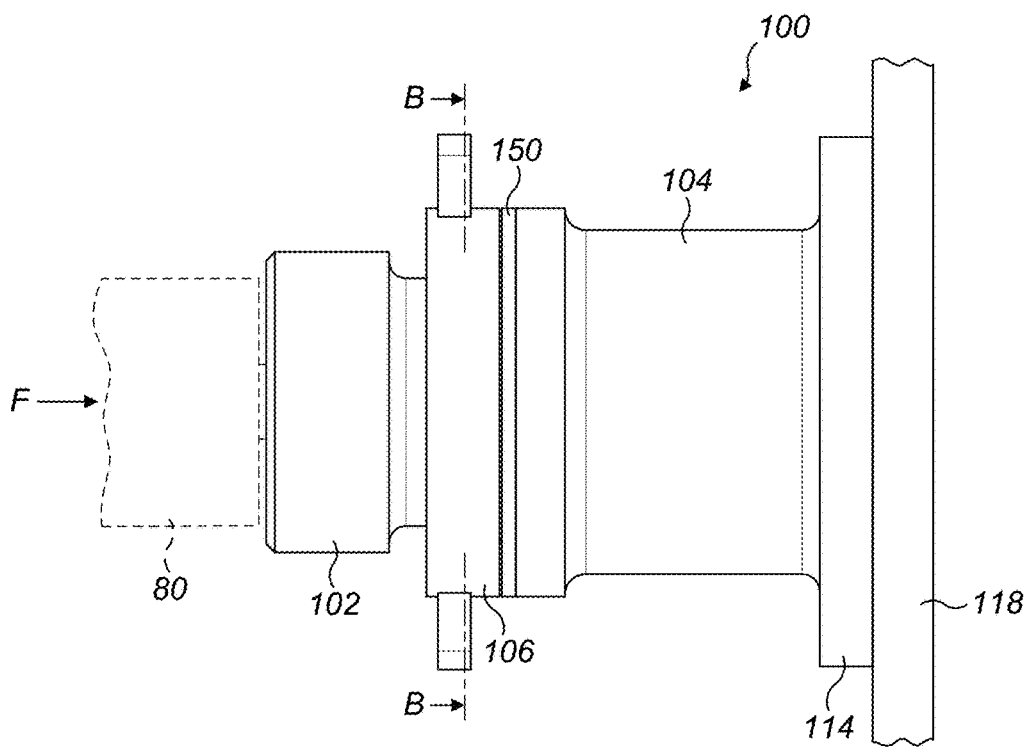

The housing 104 is, in this embodiment, provided with a mounting flange 114 comprising a plurality of openings 116 for receiving fasteners (not shown) for attaching the housing to a base 118 (FIGS. 4A & 4B). The base 118 may, for example, be a part of a RAT actuator housing as described above.

Figure 9:
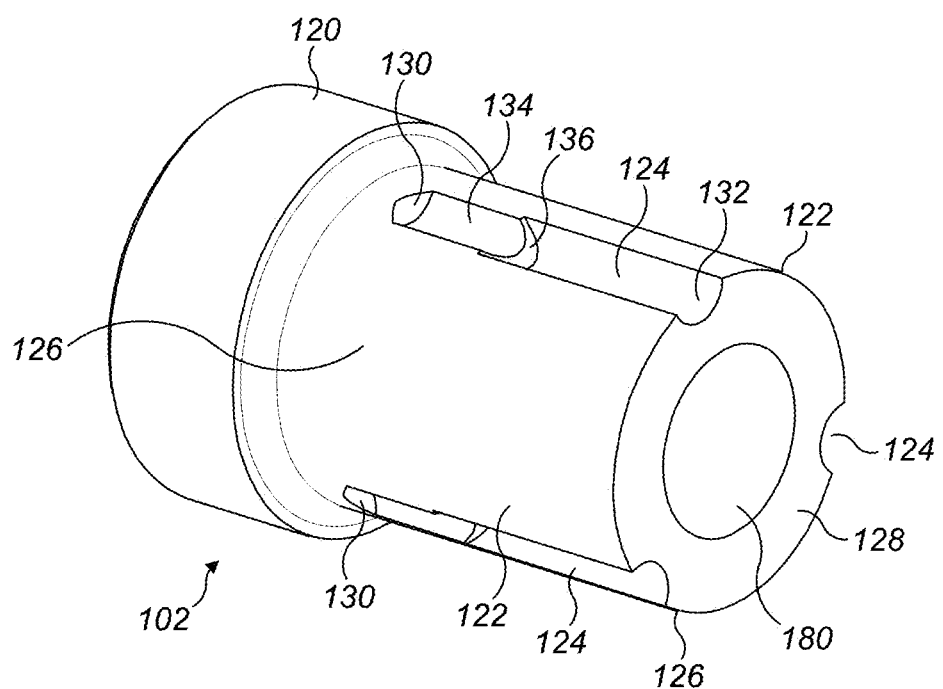
FIG. 9 shows a perspective view of the piston element of the locking mechanism.

The piston element 102, shown in greater detail in FIG. 9, comprises a head portion 120 and a shaft portion 122. The shaft portion 122 is received within the housing bore 112. In other embodiments, the piston element 102 may be of a constant cross-section having no separate head portion 120. The piston element 102 further comprises a bore 180, in this embodiment 8 through a bore 180. This bore 180 acts to reduce the weight of the piston element 102 and may also act to locate a connection between the piston element 102 and a biasing element such as the RAM turbine locking piston 38. In addition, oil may be provided in the mechanism for lubrication purposes. The bore 180 will allow oil to flow through the piston element 102 thereby avoiding any compression of oil which would resist movement of the piston element, particularly to its unlocked state.

It would also be possible to provide, additionally or alternatively, holes 190 (illustrated schematically in FIGS. 5A and 5B) through a wall of the housing 104. Such an arrangement may have the additional benefit that by varying the distribution of the holes 190, the movement of the piston element 102 within the bore 180 may be damped in a variable manner, for example in a non-linear manner. For example a greater damping effect may be achieved towards the end of the stroke of the piston element 102 by providing fewer or smaller holes 190 adjacent that end of the bore 180 (i.e. at the end adjacent the mounting flange 114). This may be beneficial in that it may decrease any impact force at the end of the stroke of the piston element 102.

The shaft portion 122 of the piston element 102 comprises three, axially extending piston grooves 124. The piston grooves 124 are circumferentially equi-spaced around the outer surface 126 of the shaft portion 122. It will be appreciated that in other embodiments, more or fewer piston grooves 124 may be provided. For example, one, two, four or more piston grooves 124 may be provided in other embodiments.

Each piston groove 124 extends into the shaft portion 122 from a distal end 128 thereof. Each piston groove 124 terminates at an end 130 towards the head portion 120 of the piston element 102. Each piston groove 124 comprises a first axially extending section 132 and a second axially extending section 134. A shoulder 136 is provided between the first axially extending section 132 and the second axially extending section 134. The first axially extending section 132 extends from the distal end 128 of the shaft portion 122 to the shoulder 136. The second axially extending section 134 extends from the shoulder 136 to the end 130 of the piston groove 124. In some embodiments, the shoulder 136 may chamfered or angled as shown.

Figure 6A:
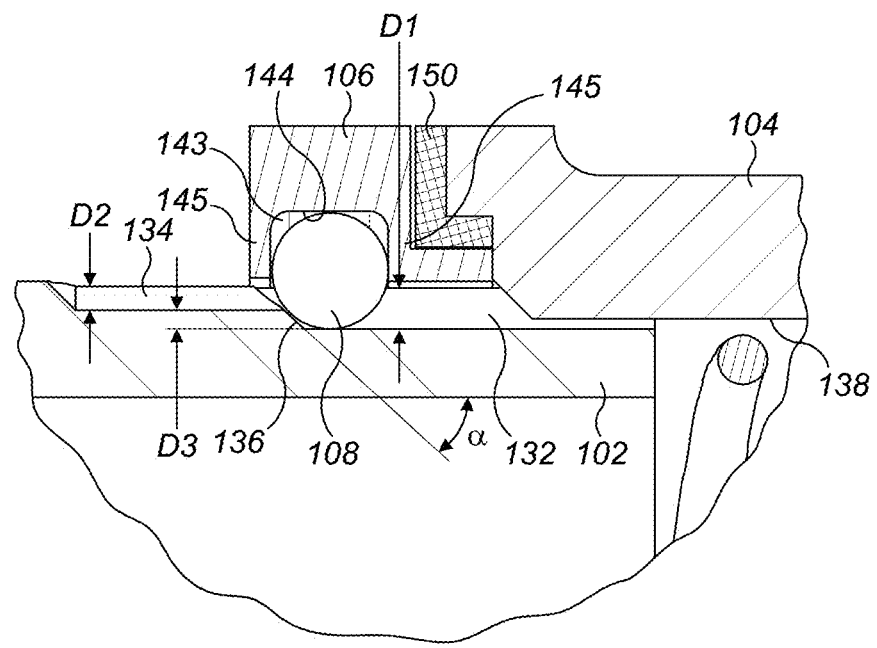
FIGS. 6A and 6B show details of FIGS. 5A and 5B respectively

As can be best seen from FIG. 6A, the first axially extending section 132 has a radial depth D1 and the second axially extending section 134 has a radial depth D2. The radial depth D1 is greater than the radial depth D2. The shoulder 136 therefore has a radial depth D3 of D1−D2. The shoulder 136 is angled or chamfered at an angle α relative to the axial direction. The angle α may be in the range of 30 to 60° for example 45°.

Figure 7:
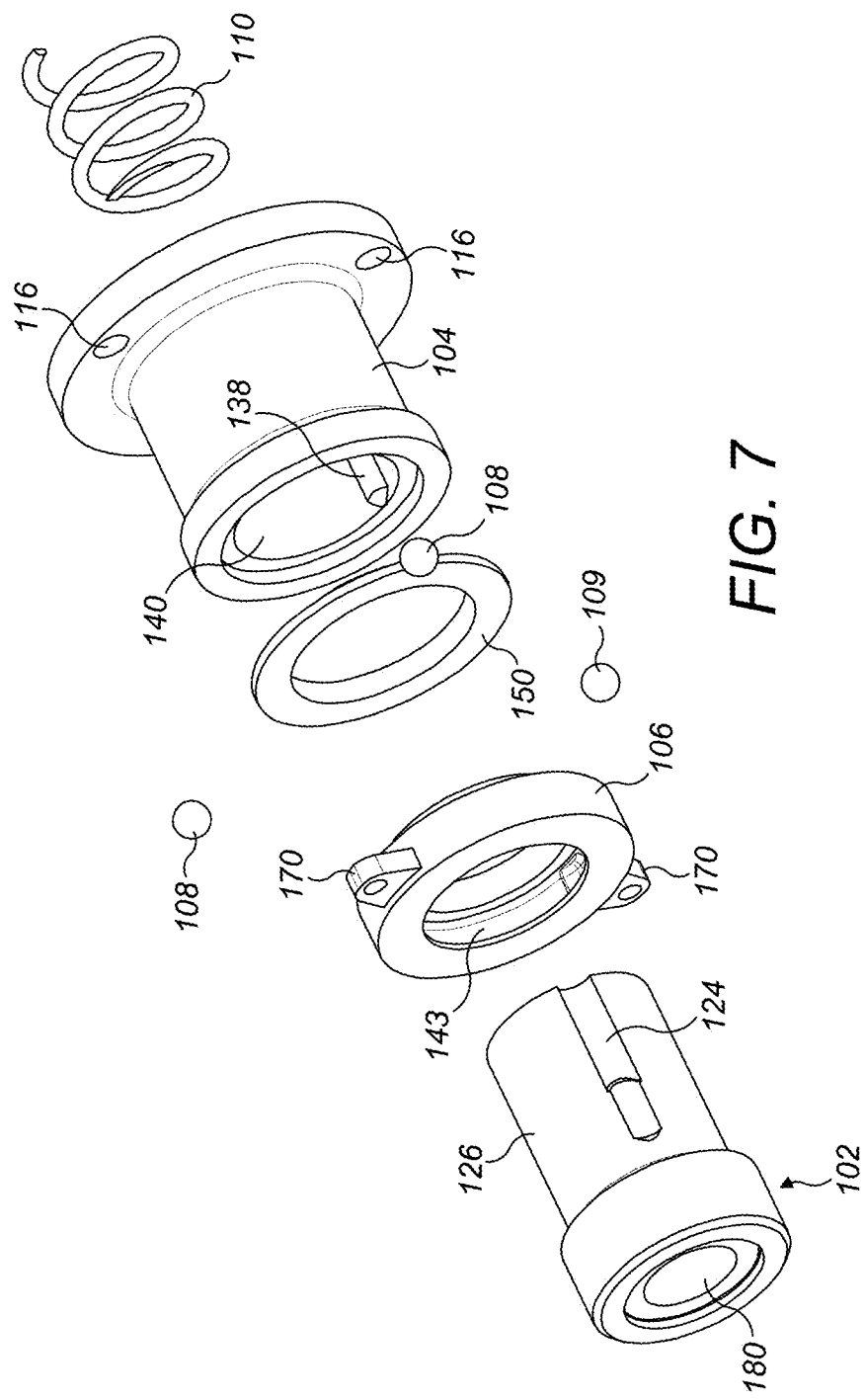
FIG. 7 shows an exploded view of the locking mechanism.

As can be seen in FIGS. 6A and 7, the housing 104 comprises an axially extending rib 138 projecting inwardly from the inner surface 140 of the housing bore 112. The rib 138 may be integrally formed with the housing 104 or a separate element suitably attached to the housing 104. The rib 138 is circumferentially aligned with one of the piston grooves 124 of the piston element 102 such that it will be received within that piston groove 124. The rib 138 is dimensioned such that it is closely received within the piston groove 124 so as to prevent relative rotation between the piston element 102 and the housing 104. The rib 138 and piston groove 124 therefore together form an anti-rotation feature. The rib 138 need only extend into the first axially extending portion 132 of the piston groove 124.

In other embodiments, alternative anti-rotation features may be used, but the described arrangement is advantageous as it makes use of the piston groove 124 in the piston element 102. Alternative arrangements may include the engagement of a ball provided on one of the housing 104 and the piston element 102 in a groove provided on the other of the housing 104 and the piston element 102, or a fastener projecting through the wall of the housing 104 for engaging with a groove in the piston element 102.

Figure 5A:
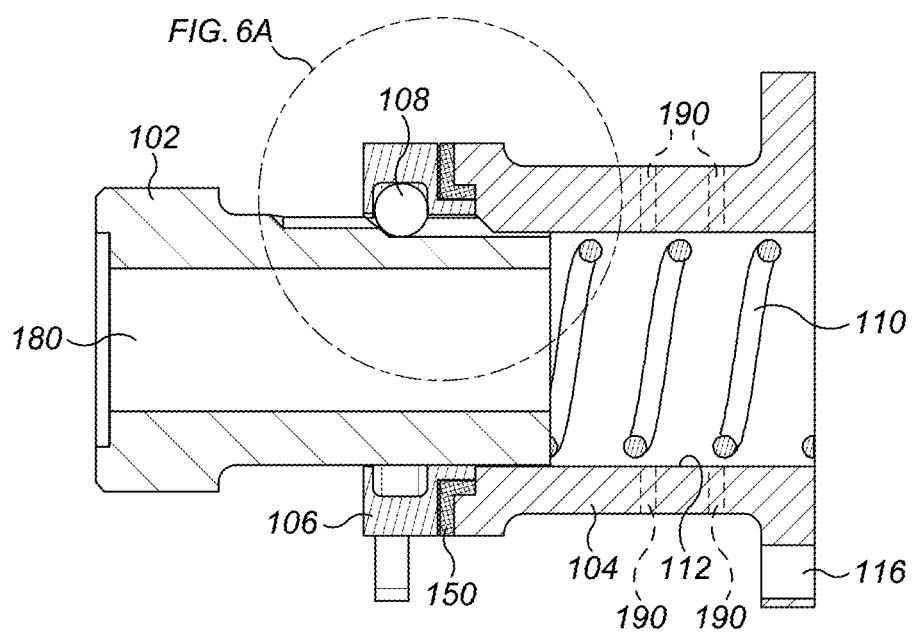
FIGS. 5A and 5B show cross sectional views through the embodiment of FIGS. 3A and 3B in the unlocked and locked positions respectively
Figure 5B:
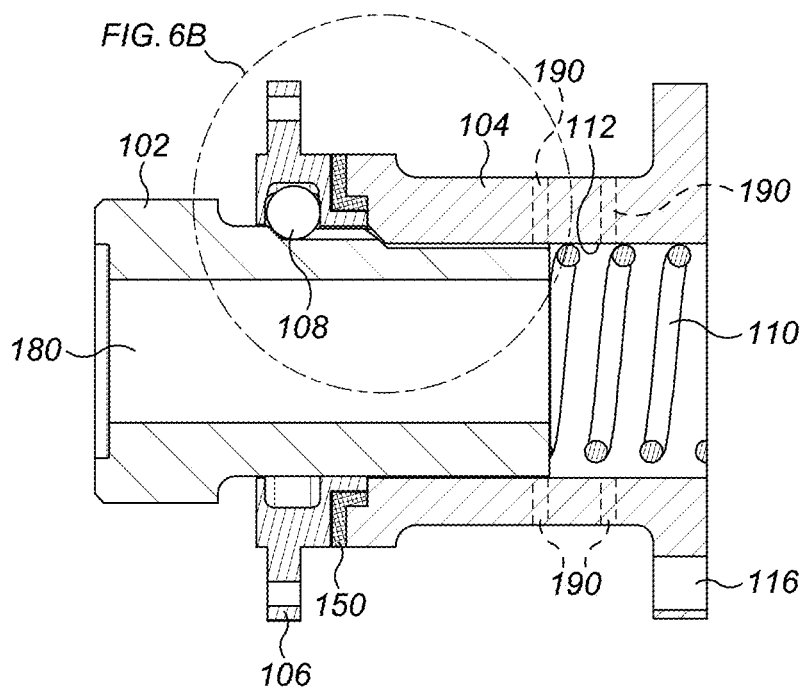

As can be seen in FIGS. 5A and 5B, for example, the return spring 110 is received within the bore 112 of the housing 104 and is sandwiched between the distal end 128 of the piston element 102 and the base 118.

As can be seen, for example in FIGS. 5A, 5B, 6A and 6B, the locking ring 106 is mounted around the piston 102 at one end 142 of the housing 104. The locking ring 106 has a groove 143 extending around its inner circumference. The groove 143 defines a circular inner surface 144 with three recesses 146 formed therein and circumferentially extending side walls 145. The recesses 146 are circumferentially spaced at the same spacing as the piston element piston grooves 124 whereby the recesses 146 may, in an unlocking position circumferentially, align with the piston grooves 124.

Figure 6B:
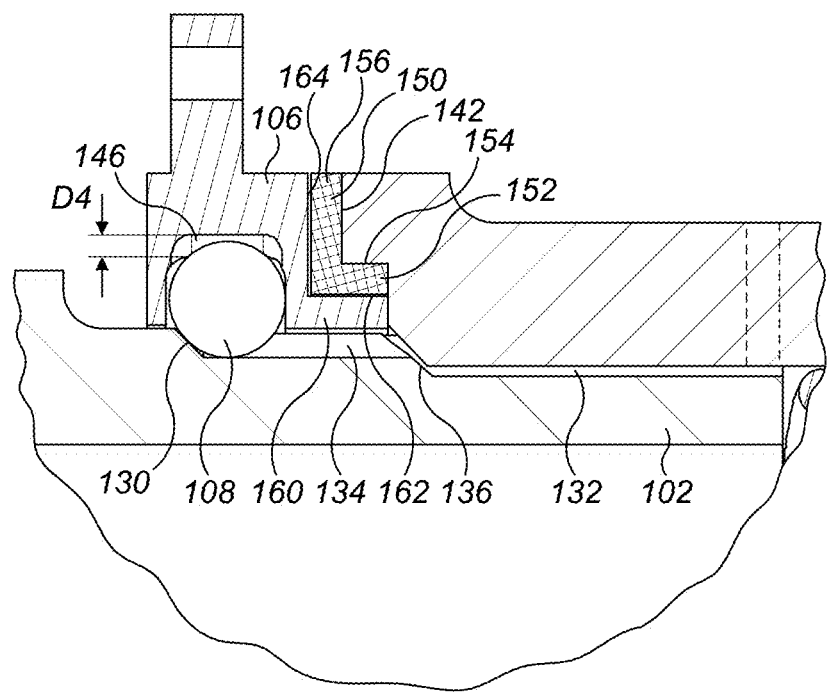

As can be seen in FIG. 6B, each recess 146 has a depth D4. D4 will be greater than or equal to the depth D3 of the shoulder 136 for reasons that will be explained further below. Also, as can be seen in FIG. 8B each recess 146 has a chamfered circumferential edge 148 again for reasons which will be explained further below.

The depths D1, D2 of the piston grooves 124, the radius D5 of the circular inner surface 144 of the locking ring groove 143 and the depth D4 of the recesses 146 are such as to receive the locking balls 108 between the circular inner surface 144 of the locking ring groove 143 and the first axially extending groove section 132 in the locked position of the locking ring 106 and receive the locking balls 108 between the recesses 146 and the second axially extending groove section 134 in the unlocked position of the locking ring 106.

The locking ring 106 is mounted to the end 142 of the housing 104. In this embodiment, the mounting is through a bearing element 150. The bearing element 150 reduces friction between the locking ring 106 and the end 140 of the housing when the locking ring 106 is urged towards the housing 104 in use and facilitates rotation of the locking ring 106. In this embodiment, the bearing element 150 is in the form of a ring which may be made from a low friction material such as PTFE. Of course other forms of bearing 150 may be used. In other embodiments, the bearing 150 may be dispensed with.

In this embodiment, as can best be seen in FIGS. 6A and 6B, the bearing element 150 comprises an axially extending rim 152 which is received in a bore 154 formed in the end 142 of the housing 104 and an annular flange 156 which abuts the end 142 of the housing 106. The locking ring 106 comprises an axially extending rim 160 which is received within the inner diameter 162 of the axially extending rim 152 of the bearing element 150. The locking ring 106 further comprises an axially facing surface 164 which in use abuts the annular flanged 156 of the bearing element 150.

The locking ring 106 further comprises a pair of lugs 170 extending from an outer surface thereof. The lugs 170 are connected through linkages 172 to respective actuators 174. The actuators 174 may be any suitable linear actuator, for example a solenoid actuator. In this embodiment two actuators 174 are provided. This provides a level of redundancy in the system and also acts to equalise rotational forces on the locking ring 106. However, less or fewer actuators may be provided in other embodiments. The actuators 174 may be connected to the locking ring 106 at circumferentially equispaced locations. Thus in this embodiment, the lugs 170 are diametrically opposed.

Figure 8A:
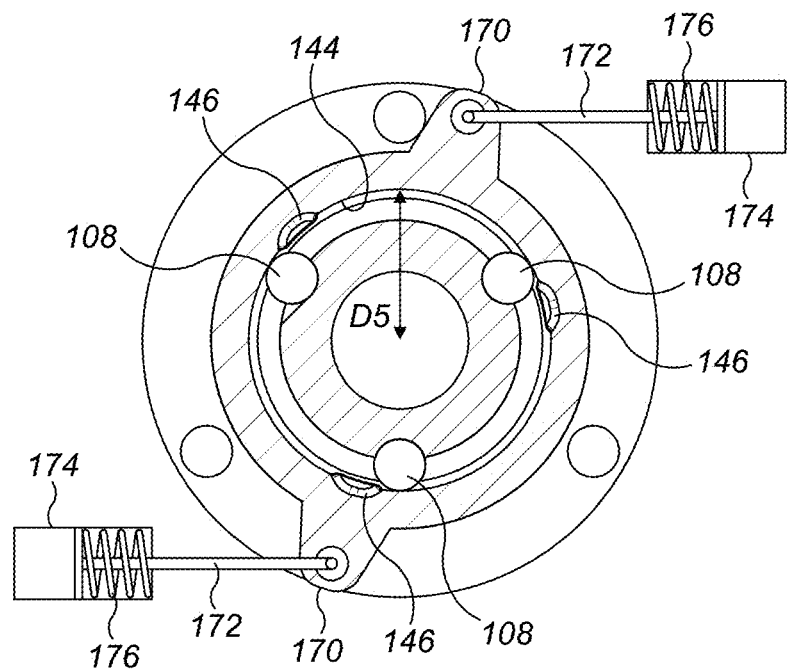
FIGS. 8A and 8B show sections through FIGS. 4A and 4B respectively.
Figure 8B:
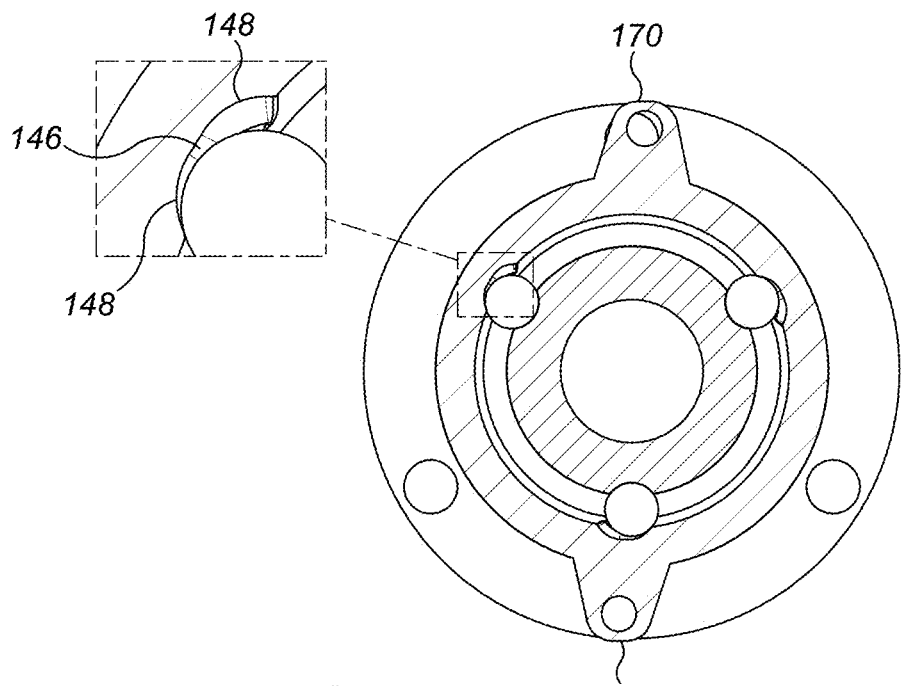

In this embodiment, the actuators 174 operate to push against the lugs 170 of the locking ring 106 to effect rotation of the locking ring 106 from the locked position shown in FIG. 8A to the unlocked position shown in FIG. 8B. In other embodiments, however, the actuators 174 may pull the lugs 170 to effect rotation. Thus either "push" or "pull" actuators may be used. Although linear actuators are used in this embodiment, other actuators, for example rotary actuators may be used. The actuators 174 and/or the locking ring 106 may be provided with return springs 176 (illustrated schematically) in FIG. 8A which urge the actuator 174 and/or the locking ring 106 towards their locking positions.

The operation of the locking mechanism 100 will now be described.

As discussed above, the housing 104 may be mounted to a base 118 in the actuating mechanism or other mechanism to be released. In the context of the RAT actuator disclosed in FIGS. 1 and 2, the base 118 may be suitably mounted in or be part of a head region 200 of the actuator.

The piston element 102 is coupled to the locking element of the mechanism to be released. In the RAT embodiment of FIGS. 1 and 2, the piston element 102 may be abutted against an end 80 of the locking piston 38 or some other component which is coupled thereto. The end 80 or component may have a portion 202 which slidingly extends into the bore 180 of the piston element 102, for example.

The biasing spring 42 of the RAT locking mechanism (or in other embodiments, a suitable biasing element) exerts a force F in the axial direction A. The locking mechanism 100 will hold the locking piston 38 when it is in the locking position shown in FIGS. 3A to 8A.

In this locking position, the piston element 102 extends from the housing 104. The locking ring 106 is in a circumferential position such that the circular inner surface 144 of the locking ring groove 143 is aligned with the piston grooves 124. The locking balls 108 are received in the first groove section 132. The biasing force F urges the piston element 102 into the housing 104. However, the piston element 102 can only move axially to the point where the locking balls 108 engage the piston groove shoulder 136. The angling of the shoulder 136 urges the locking balls 108 outwardly, but they are prevented from moving outwardly by the circular inner surface 144 of the locking ring groove 143. The biasing force F will also, through the engagement of the locking balls 108 with the side walls 145 of the locking ring groove 143, urge the locking ring 106 towards the housing 104.

When it is desired to unlock the RAT actuator, the solenoid actuators 174 are operated. This causes the locking ring 106 to rotate from the locked position shown in FIG. 8A to the unlocked position shown in FIG. 8B. The presence of the bearing 150 reduces the resistance to rotation of the locking ring 106, thereby potentially allowing smaller, less powerful actuators solenoids 174 to be used.

As can be seen in FIG. 11, this rotation brings the recesses 146 of the locking ring groove 143 into circumferential and radial alignment with the locking balls 108. As discussed above, the biasing force F urges the locking balls 108 radially outwardly through the chamfered shoulder 136 such that when the recesses 146 move into alignment with the locking balls 108, they are urged outwardly into the recesses 146. The depth D4 of the recesses 146 are such that the balls 108 may move into and along the second axial section 134 of the piston groove 124, allowing the piston element 102 to move further into the housing 104 to the unlocked position shown in FIGS. 3B to 8B. The biasing force F of the actuator biasing spring 42 will maintain the piston element 102 in its unlocked position.

The movement of the piston element 102 to its unlocked position compresses the return spring 110 between the distal end 128 of the piston element 102 and the base 118. As will be described further below, the compressed return spring 110 is used to return the piston element 102 to its locked position.

Once the balls 108 are arranged in the second section 134 of the piston groove 124, the solenoids 174 may be deactivated, as rotation of the locking ring 106 is prevented by the balls 108.

When it is desired to stow the RAT once more, hydraulic or other pressure may applied to the actuator in order to move the locking piston 38 in the opposite direction to the direction indicated by arrow 58 in FIG. 2. This releases the biasing force F from the piston element 102 which is then urged back towards its locked position under the action of the return spring 110, which, as discussed above, has been pre-loaded by the movement of the piston element 102 to its unlocked position.

As the piston element 102 moves, the first groove sections 132 will eventually come into alignment with the locking balls 108, such that the locking balls 108 may once more be received in the first groove sections 132. The return force of the return springs 176 provided on the locking ring 106 and/or actuators 174 will act to rotate the locking ring 106. The chamfered edge region 148 of each recess 146 will act to urge the locking balls 108 inwardly during rotation, such that the locking balls 108 properly engage with the locking groove inner surface 144 and allow the locking ring 106 to return to its locked position.

The hydraulic pressure on the actuator may then be removed so that the locking piston 38 by virtue of the biasing spring 42 will once more to act on the piston element 102 which has by now returned to its original, locked position.

The locking mechanism of embodiments of the disclosure may have several advantages over traditional toggle mechanisms. Firstly, while such toggle mechanisms may require careful shimming to ensure proper operation, this will not be required by embodiments of the disclosure. Also, the mechanism may be more reliable and easier to manufacture than toggle systems as there are no pivotal links required in the mechanism. The locking mechanism may be used to replace existing toggle mechanisms in many applications.

While the detailed embodiment has been described in the context of locking a RAT, it will be understood that the disclosure is not limited to that application. The mechanism may be used in any other systems, for example actuators, valves, pumps etc. where a locking mechanism is required to prevent movement of one or more components of the system.

It will also be understood that the above is a description of just one possible embodiment of the disclosure and that modifications may be made thereto without departing from the scope thereof.

The invention claimed is:

1. A locking mechanism comprising:
a piston element comprising a piston groove extending in an axial direction along a radially outer surface of the piston element;
a housing comprising a bore for receiving the piston element for reciprocating axial movement between a locked position and an unlocked position;
a locking ball received in the piston groove;
a locking ring mounted for rotational movement about the piston element between a locking position and an unlocking position, the locking ring comprising a radially inner locking ring groove, the locking ring groove having a recess formed in a radially inner surface thereof for receiving the locking ball in the unlocking position of the locking ring;
the piston groove comprising a first axially extending section and a second axially extending section, the radial depth (D1) of the first axially extending section being greater than the radial depth (D2) of the second axially extending section;
wherein the mechanism is configured such that when the piston element is in its locked position and the locking ring is in its locking position, the radially inner surface of the locking ring groove is in alignment with the piston groove such that the locking ball received in the first axially extending section of the piston groove is prevented from moving outwardly in a radial direction an amount sufficient to enter the second axially extending section of the piston groove; and when the piston element is in its locked position but the locking ring is in its unlocking position, the recess in the radially inner surface of the locking ring groove is in radial alignment with the piston groove such that the locking ball received in the first axially extending section of the piston groove can move radially outwardly into the recess, thereby allowing the locking ball to enter the second axially extending section of the piston groove and an axial movement of the piston element from its locked to its unlocked position under a force biasing the piston element towards the housing.

2. The locking mechanism as claimed in claim 1, wherein the piston element comprises a plurality of, for example three, piston grooves and the locking ring comprises a corresponding plurality of recesses, the mechanism comprising a respective locking ball received within each piston groove.

3. The locking mechanism as claimed in claim 2, wherein the piston grooves and the recesses are circumferentially equi-spaced around the piston element and the locking ring respectively.

4. The locking mechanism as claimed in claim 1, comprising anti-rotation elements provided between the piston element and the housing to prevent the piston element rotating in the housing.

5. The locking mechanism as claimed in claim 4, wherein the anti-rotation elements comprise at least one rib extending inwardly from the housing bore for engagement with at least one piston groove of the piston element.

6. The locking mechanism as claimed in claim 1, wherein the locking ring is rotationally mounted to the housing.

7. The locking mechanism as claimed in claim 6, comprising a bearing, for example a bearing of a low friction material, mounted between the locking ring and the housing.

8. The locking mechanism as claimed in claim 1, comprising a chamfered shoulder between the first and second axially extending sections of the piston groove.

9. The locking mechanism as claimed in claim 1, wherein the locking ring recess is chamfered at a circumferential edge thereof.

10. The locking mechanism as claimed in claim 1, further comprising a biasing element for biasing the piston element from its locked position towards its unlocked position.

11. The locking mechanism as claimed in claim 1, further comprising a return spring for biasing the piston element from its unlocked position towards its locked position.

12. The locking mechanism as claimed in claim 1, further comprising at least one actuator, for example a pair of actuators for rotating the locking ring between its locking and unlocking positions.

13. The locking mechanism as claimed in claim 12, wherein the at least one actuator is a linear actuator, for example a linear solenoid actuator.

14. The locking mechanism as claimed in claim 13, wherein said at least one actuator or said locking ring comprises a return spring for urging the locking ring towards its locking position upon de-activation of the at least one actuator.

15. A ram air turbine actuation mechanism comprising:
a spring biased locking piston movable between a first position in which the ram air turbine is held in a retracted position and a second position which releases the ram air turbine;
comprising a locking mechanism as claimed in claim 1, the locking piston being coupled to the piston element of the locking mechanism to apply a force thereto in a direction which biases the piston element towards its unlocked position.

* * * * *